United States Patent [19]

Reynolds

[11] Patent Number: 4,846,110

[45] Date of Patent: Jul. 11, 1989

[54] PROTECTIVE ENTRANCE DEVICE FOR BIRDHOUSES

[76] Inventor: Patricia E. Reynolds, Abbey Hill C5 - Route 3 - Aspen Dr., Fontana, Wis. 53125

[21] Appl. No.: 122,016

[22] Filed: Nov. 18, 1987

[51] Int. Cl.⁴ .................................... A01K 23/00
[52] U.S. Cl. ............................................. 119/23
[58] Field of Search ............... 119/15, 19, 23, 24, 119/25, 26; 49/58; 43/131; 52/101

[56] References Cited

U.S. PATENT DOCUMENTS

| | | | |
|---|---|---|---|
| 2,034,156 | 3/1936 | Snider | 119/19 |
| 3,182,634 | 12/1963 | Myaida et al. | |
| 3,211,130 | 10/1965 | Prince | 119/23 |
| 3,244,148 | 4/1966 | Long | 119/23 |
| 4,166,432 | 9/1979 | Moore | |
| 4,506,629 | 3/1985 | Cross | 119/23 |
| 4,648,201 | 3/1987 | Sherman | 43/131 |

FOREIGN PATENT DOCUMENTS 949406 6/1974 Canada .
902331 12/1953 Fed. Rep. of Germany ........ 119/23
1013112 2/1956 Fed. Rep. of Germany .
2040662 9/1980 United Kingdom .................. 119/23

Primary Examiner—Gene Mancene
Assistant Examiner—R. Thomas Price
Attorney, Agent, or Firm—Dressler, Goldsmith, Shore, Sutker & Milnamow, Ltd.

[57] ABSTRACT

A protective device for limiting access to the inside of a small animal house, such as a birdhouse, including a generally tubular, open-ended body defining a passage therethrough and having attachment members at the inner end thereof adapted to pass through an entrance hole in the wall of the house. The body may have openings in the wall for providing air and light. A locking member is threadably engaged with the outer surface of the body, and is adapted to retain the wall of the house between the locking member and body on one side and the retaining members on the other side, with the free end of the body spaced away from the entrance hole to inhibit access therethrough of animals and birds larger than those for which the house was designed.

36 Claims, 1 Drawing Sheet

U.S. Patent    Jul. 11, 1989    4,846,110
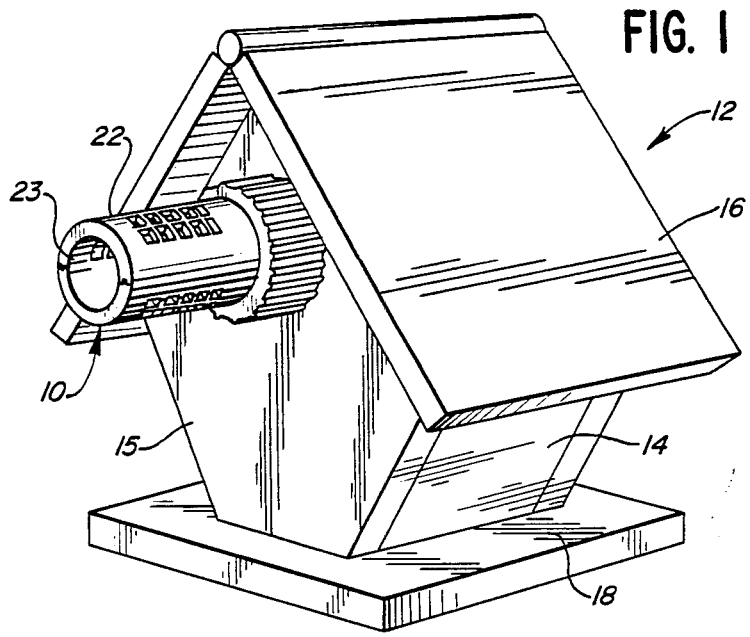
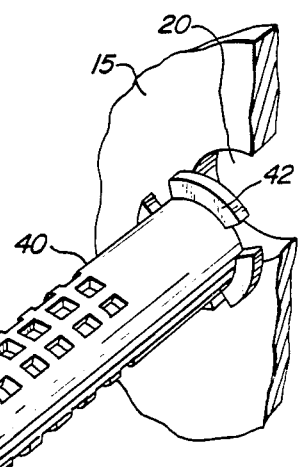
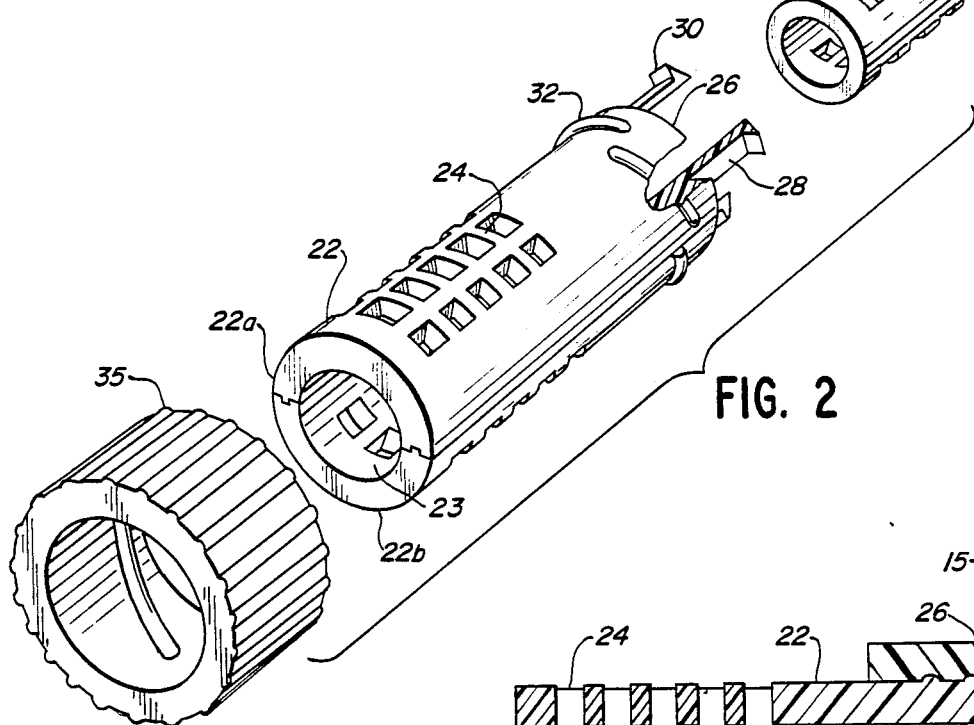
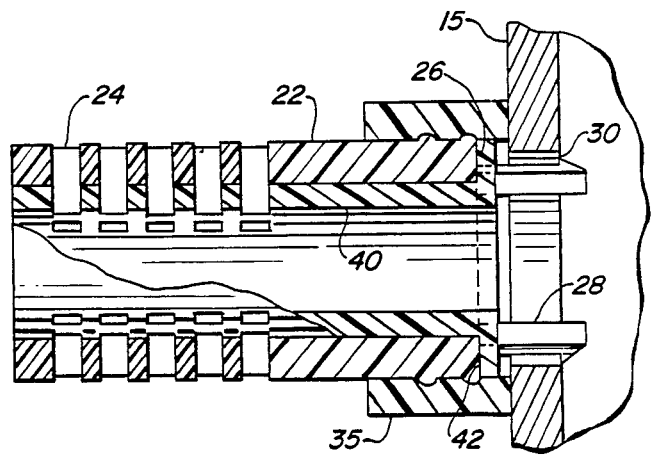

PROTECTIVE ENTRANCE DEVICE FOR BIRDHOUSES

FIELD OF THE INVENTION

The present invention relates to protective devices for animal houses, and more particularly, to birdhouse adjuncts and attachments for inhibiting the access of preying animals into birdhouses and similar structures.

BACKGROUND OF THE INVENTION

The variety of birdhouses and similar animal shelters that exist is indicative of the number of people whose love of animals takes the form of providing various shelters and food for nature's creatures. Birdhouses are among the most popular and common forms of such shelters.

Such structures provide shelter for a variety of creatures. For example, birdhouses are designed for a variety of different birds, determined, in part, by the size and shape of the houses themselves, and by the sizes of the access openings or entrance holes into the houses.

Unfortunately, birds and the nests, even when in these houses, are often subject to attack by other larger, preying animals, such as, for example, squirrels or even larger birds. While such animals may not be able to enter the entrance holes of birdhouses designed for smaller birds, they often have the ability to rech their heads, paws, or claws into the house and damage the nest and/or the eggs, or harm baby birds within the house.

Birdhouse access openings or entrance holes must be of a certain size in order to permit access to the birds for which they are designed. The diameters of entrance holes typically range in size between about one inch and about wto and one-half inches. While many entrance holes are relatively small, they are large enough to permit some access to attacking or other unwanted creatures.

It would be desirable, therefore, to be able to protect the birds inside the house, particularly baby birds during the days immediately after birth when they are at peril and risk, while simultaneously providing for convenient and ready access to the birds for which the houses are designed.

SUMMARY OF THE INVENTION

In accordance with the present invention, there is provided a protective entrance structure or tunnel for birdhouses and similar shelters which, while permitting access into the houses of the birds for which the houses are designed, limits and prevents access of larger creatures and their heads, jaws, beaks, talons, and/or paws, which otherwise are capable of reaching nto such houses and damaging nests and harming, or absconding with, the eggs or newly-born birds.

In accordance with the present invention, there is provided a protective entrance structure in the form of a generally tubular open-ended body typically cylindrical in cross-section, adapted to be attached to and interact with the access opening or entrance hole in a birdhouse. The tunnel incorporating the present invention is affixed to and extends outwardly from the birdhouse a distance sufficient to preclude access into the interior of the house of marauding and preying creatures.

The protective tunnel incorporating the present invention includes a generally tubular body portion adapted to be abutted against and extend out from a wall of a birdhouse to define a passage juxtaposed and aligned with the entrance hole. A plurality of generally flexible or coupling or attachment members are located at the house engaging inner end of the tunnel structure and are adapted to pass through the entrance hole and interact with the inside of the birdhouse wall to retain the tunnel in place. A locking and closure member cooperates with the tubular tunnel body member and interacts therewith, and with the birdhouse wall to tighten the tunnel body member against the wall, with the flexible coupling members interacting with the inside of the wall to grasp the wall therebetween and retain the tunnel protective structure in place to provide the desired shielding and protection for the creatures within the house.

The protective device, in accordance with the present invention, may be provided with a plurality of openings to allow light and air into the house through the walls of the tunnel body, as well as through the access opening thereof, to encourage creatures to use the house. An insert can be used to alter the size of the access passage through the tunnel body.

The protective tunnel device incorporating the present invention is adapted to interact with entrance holes of various birdhouses and similar structures. The flexible coupling members are adapted to be flexed inwardly and expand outwardly against the wall of the entrance hole, and have locking portions disposed internally of the house which interact with the inside surface of the house wall, and cooperate with the entrance hole, the tunnel structure, the house wall, and the locking member to position and retain the protective device in position juxtaposed with and aligned with the entrance hole in the birdhouse with the tunnel structure extending outwardly therefrom.

Numerous other advantages and features of the present invention will become readily apparent from the following detailed description of the invention and the embodiments thereof, from the claims, and from the accompanying drawings, in which the details of the invention are fully and completely disclosed as a part of this specification.

BRIEF DESCRIPTION OF THE DRAWINGS

FIG. 1 is a perspective view of a birdhouse showing a protective tunnel device incorporating the present invention in place;

FIG. 2 is an exploded view of the protective tunnel device; and

FIG. 3 is a sectional view taken along lines 3—3 of FIG. 1.

DETAILED DESCRIPTION

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

Referring to the drawing, there is shown the protective tunnel device 10 of the present invention attached to a birdhouse 12. the house 12 includes the usual side walls 14, front wall 15, back wall (not shown), roof 16, and base 18. An access opening or entrance hole 20 is provided in the front wall 15 to allow birds to enter the house 12. The size of the entrance hole 20 and the house 12 vary as a function of the birds for which the house 12 is designed. Typically, the openings 20 may range in size between about one inch and about two and one-half inches in diameter, but the size of the openings is not critical to the protective device or tunnel 10 incorporating the present invention.

The protective device 10 includes a tubular tunnel member or body 22, typically cylindrical in shape, which defines an access passage 23 passing therethrough. The tunnel 22 may be constructed in a unitary configuration or, for convenience, may be constructed as two substantially identical pieces 22a, 22b, generally semi-circular in cross-section. The body 22 of the protective tunnel device 10 may be formed with a plurality of lattice-like openings 24 to provide light and air internally of the birdhouse 12 through the entrance hole 20.

The inner end 26 of the tubular body 22 is formed with a plurality of flexible projections or fingers 28 extending therefrom, having radially outwardly directed barbs 30 formed at the free ends thereof. These projections may be angled radially outwardly so that the tunnel 10 can be utilized with access openings 20 of varying sizes. The body 22 is attached to the house 12 by inserting the barbed projections 28 through the access opening or entrance hole 20 until they pass into the interior of the birdhouse 12. The projections 28 are flexed inwardly to permit the barbs 30 to pass through the hole 10 and move out once the barbs 30 have passed into the house 12.

The barbs 30 engage inner surface of the front wall 15 around the perimeter of the opening 20. By locating the projections 28 at the inner diameter of the tunnel body 22 and tapering them outwardly, the projections and the barbs 30 work with holes of various sizes, and due to their flexibility, can be deflected radially inwardly to pass through the smaller holes as well.

The tunnel body 22 is provided with threads 32 which cooperate with a threaded locking collar 35, threaded to the external surface of the tunnel. The collar 35 is rotated and tightened against the outer surface of the birdhosue front wall 15 to draw the tunnel 22 outwardly. The barbs 30 engage the front wall 15, and hold the protective tunnel in place. In this fashion, the protective tunnel incorporating the present invention is capable of being assembled to birdhouses having openings of various sizes and varying wall thicknesses.

The tunnel body 22 can act as a perch for birds who wish to sit on the outside of the house, and yet its passage 23 is dimensioned with an opening similar to the opening of the birdhouses to permit birds of the desired size to pass therethrough internally of the house. For smaller openings, an adapter 40 can be inserted through the passage 23. Outwardly directed flanges 42 abut the inner end of the body 22 to hold the adapter in place when the tunnel structure 10 is attached to the birdhouse 12.

The length of the tunnel can range between about two and three inches, thereby limiting access to the inside of the house. This dimension is not so long as to inhibit entrance by birds for whom the house is designed, and yet is sufficiently long to prevent larger, unwanted birds and animals to be able to reach into the house with their beaks or paws or talons.

Thus, there has been disclosed a simple, effective, protective device adapted to be assembled to the access openings or entrance holes of birdhouses, whereby access thereto can be limited to the birds of a size for which the house is designed, and the access to the interior where the young may be by marauding and preying creatures, such as larger birds or squirrels, can be prevented or severely limited.

From the foregoing, it will be observed that numerous variations and modifications may be effected without departing from the true spirit and scope of the novel concept of the invention. It is to be understgood that no limitation with respect to the specific apparatus illustrated herein is intended or should be inferred. It is, of course, intended to cover, by the appended claims, all such modifications as fall within the scope of the claims.

What is claimed is:

1. A protective device for limiting access through an opening formed in one wall of a house for small animals or birds comprising:
    an elongated open-ended tubular body having first and second ends and a passage therethrough corresponding generally to the diameter of the wall opening of the house;
    attachment means extending out from said first end of said tubular body and adapted to pass through the wall opening, said attachment means having a free end portion spaced from said first end of said tubular body and outwardly extending retaining portions formed at said free end portion thereof; and
    locking means engageable with said tubular body and interacting therewith and with the one wall of the house to tighten said first end of said tubular body against the one wall of the house when said attachment means is passed through the wall opening with said retaining portions engaging the inside of the one wall to retain said tubular body in position with said passage therein aligned with the wall opening formed in the one wall of the house, whereby access to the interior of the house is obtained only through said passage in said tubular body and the wall opening of the house.

2. A device as claimed in claim 1, wherein said tubular body is generally cylindrical in cross-section.

3. A device as claimed in claim 1, wherein said attachment means comprises a plurality of flexible, diverging projections extending from said first end of said tubular body, said projections being deflectable radially inwardly to facilitate passage thereof through the wall opening in the one wall of the house.

4. A device as claimed in claim 3, wherein said free end portions of said projections flare outwardly and are engageable with the inside of the one wall of the house to retain said tubular body in position with the passage through said tubular body aligned with the opening in the one wall of the house.

5. A device as claimed in claim 4, wherein said outwardly flaring free end portions of said projections are in the form of tapered teeth configured to facilitate passage thereof through the wall opening into the house, and for resisting passage thereof through the wall opening out of the house, said teeth having surfaces substantially parallel to the one wall of the house when said projections are passed through the wall opening for engaging the inside surface of the one wall when said tubular body is withdrawn away from the one wall of the house.

6. A device as claimed in claim 5, wherein said first end of said tubular body is radially larger than the diameter of the wall opening and is engageable with the outside of the one wall of the house when said projections are passed through the wall opening.

7. A device as claimed in claim 4, including threads formed on said tubular body adjacent said first end thereof, said locking means comprising a threadable collar engageable with said threads on said tubular body and operable to abut the outside of the one wall of the house and to retain the one wall between said collar and said outwardly flared free end portions formed at the ends of said projections, whereby said tubular body is retained in place with the passage formed therein aligned with the opening in the one wall of the house.

8. A device as claimed in claim 1, wherein said tubular body is formed with a plurality of apertures therein to provide light and air therethrough to the interior of the house.

9. A device as claimed in claim 1, including a tubular adapter means disposed within said tubular body for reducing teh said of said passage, said adapter means having radially extending flange portions disposed at one end thereof and abutting said first inner end of said tubular body to be retained between said first end of said tubular body and the one wall of the house.

10. A protective device for limiting access through an opening formed in one of the walls of a house for small animals or birds comprising:
   an elongated open-ended tubular body having first and second ends and a passage therethrough corresponding generally to the diameter of the wall opening of the house;
   attachment means extending out from said first end of said tubular body and passing through the wall opening, said attachment means having a free end portion spaced from said first end and outwardly extending retaining portions formed at said free end portions thereof; and
   locking means engaging said tubular body and interacting therewith and with the one wall of the house and tightening said first end of said tubular body against the one wall of the house, said attchment means extending through the wall opening with said retaining portions engaging the inside of the one wall and retaining said tubular body in position with said passage therein aligned with the entrance hole formed in the one wall of the house, whereby access to the interior of said house is obtained only through said passage in said tubular body and the wall opening of said house.

11. A device as claimed in claim 10, wherein said tubular body is generally cylindrical in cross section.

12. A device as claimed in claim 10, wherein said attachment means comprises a plurality of flexible, diverging projections extending from said first end of said tubular body, said projections being deflectable radially inwardly to facilitate passage thereof through the wall opening of said house.

13. A device as claimed in claim 12, wherein the free end portions of said projections flare outwardly, engage the inside of the one wall of the house, and retain said tubular body in position with the passage through said tubular body aligned with the wall opening of the house.

14. A device as claimed in claim 13, wherein asid first end of said tubular body is radially larger than the diameter of the wall opening and engages the outside of the one wall of the house when said projections pass through the wall opening.

15. A device as claimed in claim 13, including threads formed on said body adjacent said first end thereof, said locking means comprising a threadable collar engaging. said threads and operable to abut the outside of the one wall of the house and retain the wall between said collar and said outwardly flared free end portions of said projections for retaining said tubular body in place with the passage formed therein aligned with the opening in the one wall of the house.

16. A device as claimed in claim 10, wherein said tubular body is formed with a plurality of apertures therein to provide light and air therethrough to the interior of the house.

17. A device for limiting access through an opening in a wall of an enclosure for small animals or birds, comprising:
   a. an elongated open-ended tubular body of finite length having a passage therethrough corresponding generally to the shape and dimension of the wall opening in the enclosure, said tubular body having a plurality of apertures formed therein to provide light and air through said tubular body to interior of the enclosure; and
   b. means for attaching one end of said tubular body to the enclosure wall to provide access into the enclosure through said passage in said tubular body and through the wall opening.

18. A device as claimed in claim 17, wherein said tubular body is positioned totally outside the enclosure.

19. A device as calimed in claim 17, wherein said tubular body has length sufficient to impede access to the interior of the enclosure of creatures too large to pass through said tubular body passage.

20. A device as claimed in claim 17, further comprising tubular adapter means disposed within said tubular body to reduce the size of said passage therethrough, said tubular adapter means being provided with a plurality of apertures to allow light and air through said tubular body to interior of said enclosure.

21. A device for limiting access through an opening in a wall of an enclosure for small animals or birds, comprising:
   a. an elongated open-ended tubular body of finite length having a passage therethrough corresponding generally to the shape and dimension of the wall opening in the enclosure;
   b. attachment means extending from one end of said tubular body, said attachment means being insertable through the wall opening, said attachment means comprising a plurality of flexible means comprising a plurality of flexible, generally diverging projections, radially inwardly defletable to facilitate insertion through the wall opening, each said projection having a free end that flares outwardly to engage inside of the wall opening to maintain said tubular body in alignment with the wall opening; and
   c. locking means cooperating with said attachment means for securely attaching said tubular body to the wall at the wall opening.

22. A device as claimed in claim 21, wherein said one end of said tubular body is larger than the wall opening and engages outside surface of the enclosure wall when said projections are inserted through the wall opening.

23. A device as claimed in claim 21, including threads formed on said tubular body adjacent said one end thereof, said locking means comprising a threadable collar engagable with said threads and operable to abut outside of the enclosure wall and retain the wall between said collar and said outwardly flaring free ends of said flexible projections when said projections are insertd through the wall opening.

24. A device as claimed in claim 21, wherein said tubular body is provided with a plurality of apertures to provide light and air through said tubular body to the interior of the enclosure.

25. A device for limiting access through an opening in a wall of an enclosure for small animals or birds comprising:
   a. an elongated open-ended tubular body of finite length having a passage therethrough corresponding generally to the shape and dimension of the wall opening in the enclosure, said tubular body having a plurality of apertures formed therein to provide light and air through said tubular body to interior of the enclosure; and
   b. attachment means for securing a first end of said tubular body to the enclosure wall to provide access into the enclosure through said passage in said tubular body and through the wall opening.

26. A device as claimed in claim 25, wherein said tubular body is generally cylindrical in cross-section.

27. A device as claimed in claim 25, wherein said attachment means comprises a tubular collar at said first end of said tubular body, said tubular body having a plurality of projections extending longitudinally and outwardly from said first end thereof, said projections defining a radius generally equal to the wall opening and being insertable therethrough.

28. A device as claimed in claim 27, wherein said projections are flexible and generally diverging and radially and inwardly deflectable to facilitate insertion through the wall opening, each said projection having a free end that flares outwardly to engage inside of the enclosure wall when said tubular collar abuts the outside of the enclosure wall.

29. A device as claimed in claim 28, wherein said outwardly flaring free end of each said projection is in the form of a tapered tooth configured to facilitate insertion of said attachment means into the wall opening, said tooth having a surface substantially parallel to the enclosure wall for engaging inside thereof.

30. A device for limiting access through an opening in a wall of an enclosure for small animals or birds comprising:
   an elongated open-ended tubular body of finite length having a passage therethrough and extending outwardly from and generally perpendicular to the enclosure wall, said passage being aligned with the wall opening, one end of said tubular body terminating at said wall opening, said tubular body including a plurality of apertures to provide light and air through said tubular body to interior of the enclosure.

31. A device as claimed in claim 30, wherein said tubular body is generally cylindrical in cross-section.

32. A device as claimed in claim 30, wherein said tubular body terminates outside of the enclosure.

33. A method for preventing animal predators from reaching through an opening in a wall of an enclosure for small animals or birds, which comprises the steps of:
   a. aligning one end of an open-ended tubular device having a finite length sufficient to prevent animal predators from reaching through an enclosure wall opening and a passage therethrough with the enclosure wall opening;
   b. providing said tubular body with a plurality of perforations to allow light and air to pass therethrogh and to enter theenclosure; and
   c. securely attaching said one end of said tubular device to the enclosure wall to provide a continuous path through said device and enclosure wall into the enclosure.

34. The method as defined by claim 33, wherein said tubular device includes a plurality of projections extending longitudinally and outwardly from said one end thereof, and including the step of inserting said projections through the wall opening.

35. The method as defined by claim 33, which further comprises the step of providing said tubular body with a plurality of perforations to allow light and air to pass therethrough and to enter the enclosure.

36. The method as defined by claim 33, which further comprises the step of inserting a smaller tubular device within said tubular device to decrease size of said passage through said tubular device.

* * * * *